(12) United States Patent
Chu (10) Patent No.: US 10,876,396 B2
(45) Date of Patent: Dec. 29, 2020

(54) BIT-SCRAMBLING IN DIFFERENTIAL PULSE POSITION MODULATION

(71) Applicant: Halliburton Energy Services, Inc., Houston, TX (US)

(72) Inventor: Jianying Chu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/072,941

(22) PCT Filed: Mar. 11, 2016

(86) PCT No.: PCT/US2016/022144
§ 371 (c)(1),
(2) Date: Jul. 26, 2018

(87) PCT Pub. No.: WO2017/155547
PCT Pub. Date: Sep. 14, 2017

(65) Prior Publication Data
US 2019/0078436 A1 Mar. 14, 2019

(51) Int. Cl.
*E21B 47/20* (2012.01)
*G01V 1/40* (2006.01)
*G01V 3/18* (2006.01)
*G01V 11/00* (2006.01)

(52) U.S. Cl.
CPC .............. *E21B 47/20* (2020.05); *G01V 1/40* (2013.01); *G01V 3/18* (2013.01); *G01V 11/002* (2013.01)

(58) Field of Classification Search
CPC .......... E21B 47/182; G01V 1/40; G01V 3/18; G01V 11/002
USPC ........................................................ 367/83
See application file for complete search history.

(56) References Cited

U.S. PATENT DOCUMENTS

| | | | |
|---|---|---|---|
| 4,513,403 | A | 4/1985 | Troy |
| 6,021,095 | A | 2/2000 | Tubel et al. |
| 6,788,219 | B2 | 9/2004 | Sun et al. |
| 6,963,290 | B2 | 11/2005 | Marsh et al. |
| 7,068,182 | B2 | 6/2006 | Golla et al. |

(Continued)

FOREIGN PATENT DOCUMENTS

WO 9305600 3/1993

OTHER PUBLICATIONS

Hongtao Li et al.: "Propagation of MWD Mud Pulse during High Temperature Deep Well Drilling Operations", Mathematical Problems in Engineering. vol. 2013, Article ID 243670.

(Continued)

*Primary Examiner* — Kam Wan Ma
(74) *Attorney, Agent, or Firm* — Benjamin Ford; C. Tumey Law Group PLLC (57) ABSTRACT

A system, in some embodiments, comprises: a controller; and a mud pulse telemetry modulator coupled to the controller and configured to modulate a mud column using differential pulse position modulation (DPPM) code words comprising most significant bits and least significant bits, wherein the controller allocates the most significant bit in each of said code words to a first data parameter having a first importance value and the least significant bit in each of said code words to a second data parameter having a second importance value that is lower than the first importance value.

20 Claims, 6 Drawing Sheets

(56) References Cited

U.S. PATENT DOCUMENTS

| | | | |
|---|---|---|---|
| 7,106,210 B2 | 9/2006 | Golla et al. | |
| 7,167,101 B2 | 1/2007 | Golla et al. | |
| 8,237,584 B2* | 8/2012 | Hall | G01V 11/002 |
| | | | 175/50 |
| 8,654,832 B1* | 2/2014 | Hansen | H04B 10/5161 |
| | | | 375/239 |
| 8,880,349 B2 | 11/2014 | Pillai et al. | |
| 2005/0046592 A1* | 3/2005 | Cooper | G01V 11/002 |
| | | | 340/855.7 |
| 2010/0188253 A1 | 6/2010 | Shearer | |
| 2011/0005835 A1 | 1/2011 | Li | |
| 2011/0058602 A1* | 3/2011 | Farine | H04L 25/4902 |
| | | | 375/239 |
| 2011/0299400 A1* | 12/2011 | Cohen | H04L 47/17 |
| | | | 370/237 |
| 2013/0093597 A1* | 4/2013 | Stolpman | H04L 27/2615 |
| | | | 340/854.3 |
| 2013/0111189 A1* | 5/2013 | Boehl | G06F 1/04 |
| | | | 712/29 |
| 2013/0279561 A1* | 10/2013 | Jin | H04L 25/4902 |
| | | | 375/239 |
| 2014/0077964 A1* | 3/2014 | Beligere | E21B 47/00 |
| | | | 340/853.3 |
| 2014/0149824 A1* | 5/2014 | Ordentlich | G11C 7/1006 |
| | | | 714/763 |
| 2014/0240140 A1* | 8/2014 | Switzer | E21B 47/122 |
| | | | 340/854.6 |
| 2014/0254322 A1 | 11/2014 | Schlumberger | |
| 2015/0226058 A1* | 8/2015 | Stolpman | E21B 47/18 |
| | | | 702/9 |
| 2016/0197560 A1* | 7/2016 | Leedham | H04L 12/40013 |
| | | | 363/78 |
| 2016/0350670 A1* | 12/2016 | Poyyara | E21B 33/138 |
| 2018/0003043 A1* | 1/2018 | Gelman | E21B 47/121 |
| 2019/0052374 A1* | 2/2019 | Lie | E21B 47/12 |

OTHER PUBLICATIONS

R. Hutin et al:"New Mud Pulse Telemetry Techniques for Deepwater Applications and Improved Real-time Data Capabilities," SPE/IADC 67762, Mar. 2001.

International Search Report and Written Opinion for PCT/US2016/022144 dated Nov. 22, 2016.

* cited by examiner

| DATA BYTES | | | | | BITMAP OF DATA BYTES | | | |
|---|---|---|---|---|---|---|---|---|
| B1 | $B1_0$ | $B1_1$ | $B1_2$ | $B1_3$ | $B1_4$ | $B1_5$ | $B1_6$ | $B1_7$ |
| B2 | $B2_0$ | $B2_1$ | $B2_2$ | $B2_3$ | $B2_4$ | $B2_5$ | $B2_6$ | $B2_7$ |
| B3 | $B3_0$ | $B3_1$ | $B3_2$ | $B3_3$ | $B3_4$ | $B3_5$ | $B3_6$ | $B3_7$ |
| B4 | $B4_0$ | $B4_1$ | $B4_2$ | $B4_3$ | $B4_4$ | $B4_5$ | $B4_6$ | $B4_7$ |

FIG. 5B

| CODE WORD | 1 | 2 | 3 | 4 | 5 | 6 | 7 | 8 |
|---|---|---|---|---|---|---|---|---|
| NORMAL ALLOCATION | $B1_0 ... B1_3$ | $B1_4 ... B1_7$ | $B2_0 ... B2_3$ | $B2_4 ... B2_7$ | $B3_0 ... B3_3$ | $B3_4 ... B3_7$ | $B4_0 ... B4_3$ | $B4_4 ... B4_7$ |
| PROPOSED ALLOCATION | $B4_0 ... B1_0$ | $B4_1 ... B1_1$ | $B4_2 ... B1_2$ | $B4_3 ... B1_3$ | $B4_4 ... B1_4$ | $B4_5 ... B1_5$ | $B4_6 ... B1_6$ | $B4_7 ... B1_7$ |

FIG. 6

BIT-SCRAMBLING IN DIFFERENTIAL PULSE POSITION MODULATION

BACKGROUND

Mud pulse telemetry—and, more specifically, differential pulse position modulation (DPPM)—is one type of telemetry technique used to communicate data between surface equipment and drill string tools during a drilling operation. Such data is communicated by pressure-modulating the drilling mud column—for example, by increasing or decreasing the pressure of the drilling mud column at specified intervals. When such mud pulses are generated at one end of the drill string, however, they typically experience a significant amount of attenuation and distortion as they travel to the other end of the drill string (e.g., due to mud attenuation, drill string vibration and mud pump noise). The resulting reduction in signal-to-noise ratio can complicate the decoding of the mud pulses once they are received.

BRIEF DESCRIPTION OF THE DRAWINGS

Accordingly, there are disclosed in the accompanying drawings and in the following description various bit-scrambling techniques that may be employed when performing differential pulse position modulation (DPPM) to facilitate the reliable interpretation of received data. In the drawings.

DETAILED DESCRIPTION

Disclosed herein is a bit-scrambling technique that may be employed when performing differential pulse position modulation (DPPM) to facilitate the reliable interpretation of received data. The technique comprises at least two aspects. First, the bits included in each DPPM code word are advantageously allocated so that the code word bits that are least susceptible to environmental noise contain data that is considered to be of relatively greater importance or of relatively greater volatility (e.g., inclination of drill string), and so that the code word bits that are most susceptible to environmental noise contain data that is considered to be of relatively lesser importance or of relatively lesser volatility (e.g., downhole temperature). Second, this bit allocation scheme may be periodically adjusted so that the data of relatively lesser importance (or lesser volatility) is transmitted using the code word bits that are least susceptible to environmental noise. This permits the controller at the receiver to periodically assess changes in the less important or less volatile parameters. Changes observed in a less-volatile parameter when that parameter is allocated to a less susceptible code word bit versus when that parameter is allocated to a more susceptible code word bit may be used to characterize the mud column. This characterization may then be used to mathematically correct future transmissions received via the more susceptible code word bits. The characterization may also be used to determine a time-average bit error rate (BER) for the channel, which may in turn be used to maximize data throughput while meeting predetermined BER requirements.

Figure 1:
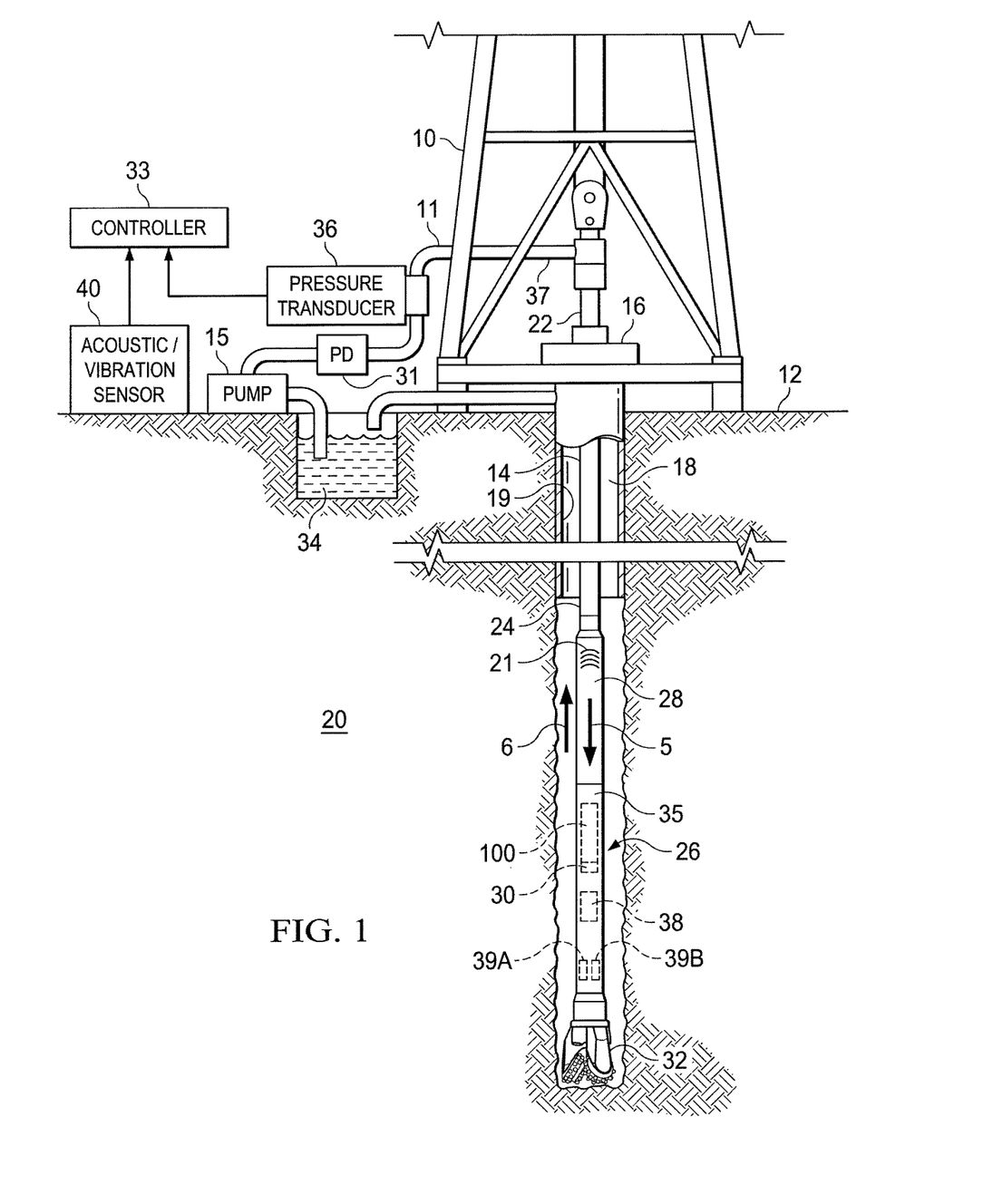
FIG. 1 is a schematic diagram of a drilling operation.

FIG. 1 is a schematic diagram of a drilling operation. More specifically, FIG. 1 depicts an illustrative MPT environment that includes a drilling derrick 10, constructed at the surface 12 of the well, supporting a drill string 14. The drill string 14 extends through a rotary table 16 and into a borehole 18 that is being drilled through earth formations 20. The drill string 14 may include a kelly 22 at its upper end, drill pipe 24 coupled to the kelly 22, and a BHA 26 coupled to the lower end of the drill pipe 24. The BHA 26 may include drill collars 28, a survey tool (e.g., a MWD or LWD tool) 30, and a drill bit 32 for penetrating through earth formations to create the borehole 18. In operation, the kelly 22, the drill pipe 24 and the BHA 26 may be rotated by the rotary table 16. Alternatively, or in addition to the rotation of the drill pipe 24 by the rotary table 16, the drill bit 32 may also be rotated, as will be understood by one skilled in the art, by a downhole motor such as a mud motor (not specifically shown). The drill collars add weight to the drill bit 32 and stiffen the BHA 26, thereby enabling the BHA 26 to apply weight to the drill bit 32 without buckling. The weight applied through the drill collars to the drill bit 32 permits the drill bit 32 to crush the underground formations.

As shown in FIG. 1, BHA 26 may include a survey tool 30, which may be part of the drill collar section 28. As the drill bit 32 operates, drilling fluid (commonly referred to as "drilling mud") may be pumped from a mud pit 34 at the surface by pump 15 through standpipe 11 and feed pipe 37, through drill string 14, and to the drill bit 32 as indicated by arrow 5. The drilling mud is discharged from the drill bit 32 and functions to cool and lubricate the drill bit 32, and to carry away earth cuttings made by the drill bit 32. After flowing through the drill bit 32, the drilling fluid flows back to the surface through the annular area between the drill string 14 and the borehole wall 19, indicated by arrow 6, where it is collected and returned to the mud pit 34 for filtering. The circulating column of drilling mud flowing through the drill string 14 may also function as a medium for transmitting pressure signals 21 carrying information from the survey tool 30 (or other downhole tool) to the surface or from the surface to the survey tool 30 (or other downhole tool). In one embodiment, a downhole data signaling unit 35 is provided as part of survey tool 30. Data signaling unit 35 may include a pulser (or modulator) 100 for generating pressure signals (e.g., via restriction (positive pulses) or diversion (negative pulses)) used for MPT.

Survey tool 30 may include sensors 39A and 39B, which may be coupled to appropriate data encoding circuitry, such as an encoder 38, which sequentially produces encoded digital data electrical signals representative of the measurements obtained by sensors 39A and 39B. While two sensors are shown, one skilled in the art will understand that fewer or more sensors may be used without departing from the principles of the present invention. The sensors 39A and 39B may be selected to measure downhole parameters including, but not limited to, environmental parameters, directional drilling parameters, and formation evaluation parameters. Example parameters may comprise downhole pressure; downhole temperature; tool string vibration; weight and torque on the drill bit; the resistivity, porosity or conductivity of earth formations; and position and/or orientation information.

As shown, the survey tool 30 may be located proximate to the bit 32 to collect data. While some or all of the collected data may be stored by the survey tool 30, at least some of the collected data may be transmitted in the form of pressure signals by data signaling unit 35, through the drilling fluid in drill string 14. The data stream conveyed via the column of drilling fluid (or "mud column") may be detected at the surface by a pressure transducer 36, which outputs an electrical signal representing fluid pressure in a tubular as a function of time. The signal output from pressure transducer 36 is conveyed to controller 33, which may be located proximate the rig floor. Alternatively, controller 33 may be located away from the rig floor. In one embodiment, controller 33 may be part of a portable logging vehicle or facility.

As shown in FIG. 1, the controller 33 also receives acoustic or vibration data from an acoustic sensor or vibration sensor 40 positioned on or near the pump 15. As described herein, acoustic or vibration data obtained from the acoustic sensor or vibration sensor 40 is analyzed to estimate pump noise or related parameters such as pump stroke timing information. With a pump noise estimate or related parameters derived at least in part from the acoustic or vibration data collected by the acoustic sensor or vibration sensor 40, the controller 33 is able to demodulate the data stream from the electrical signal received from the pressure transducer 36. As an example, the demodulated data stream may correspond to downhole drilling parameters and/or formation characteristics measured by sensors 39A and 39B, or by survey tool 30.

The pump noise to be accounted for or filtered during the demodulation process is caused by the operation of pump 15, which is normally piston-based and causes a significant degree of pressure variation due to the action of the pistons and valves. In at least some embodiments, a pulsation dampener 31 is positioned along feed pipe 37 or standpipe 11 to attenuate the (relatively) high-frequency variation, typically with only a moderate degree of success. Downstream of the pulsation dampener 31, the pressure transducer 36 senses pressure variations in the fluid within the feed pipe 37 and generates corresponding signals. In different embodiments, the pressure transducer 36 may be directly in contact with the fluid conveyed via feed pipe 37 (e.g., the pressure transducer 36 physically responds to pressure variations in the fluid), or may be coupled to a tubular housing (e.g., the pressure transducer 36 measures dimensional changes in the feed pipe 37 resulting from pressure variations in the flow stream). In either case, the pressure transducer 36 provides a measurable reference signal (e.g., voltage, current, phase, position, etc.) that is correlated with fluid pressure as a function of time (i.e., $dP(t)/dt$). The correlation of the reference signal and fluid pressure may vary for different pressure transducer configurations.

In at least some embodiments, an example pressure transducer configuration employs a piezoelectric material attached to or surrounding the feed pipe 37. When the pressure of fluid conveyed via the feed pipe 37 changes, the piezoelectric material is distorted, resulting in a different voltage level between two measurement points along the piezoelectric material. Another pressure transducer configuration employs an optical fiber wrapped around the feed pipe 37. When the pressure of fluid conveyed via the feed pipe 37 changes, the dimensions of feed pipe 37 changes resulting in the wrapped optical fiber being more or less strained (i.e., the overall length of the optical fiber is affected). The amount of strain or change to the optical fiber length can be measured (e.g., using interferometry to detect a phase change) and correlated with the pressure of fluid conveyed via the feed pipe 37. It should also be appreciated that multiple pressure transducers 36 may be employed at different points along the feed pipe 37. The outputs from multiple pressure transducers may be averaged or otherwise combined.

Figure 2:
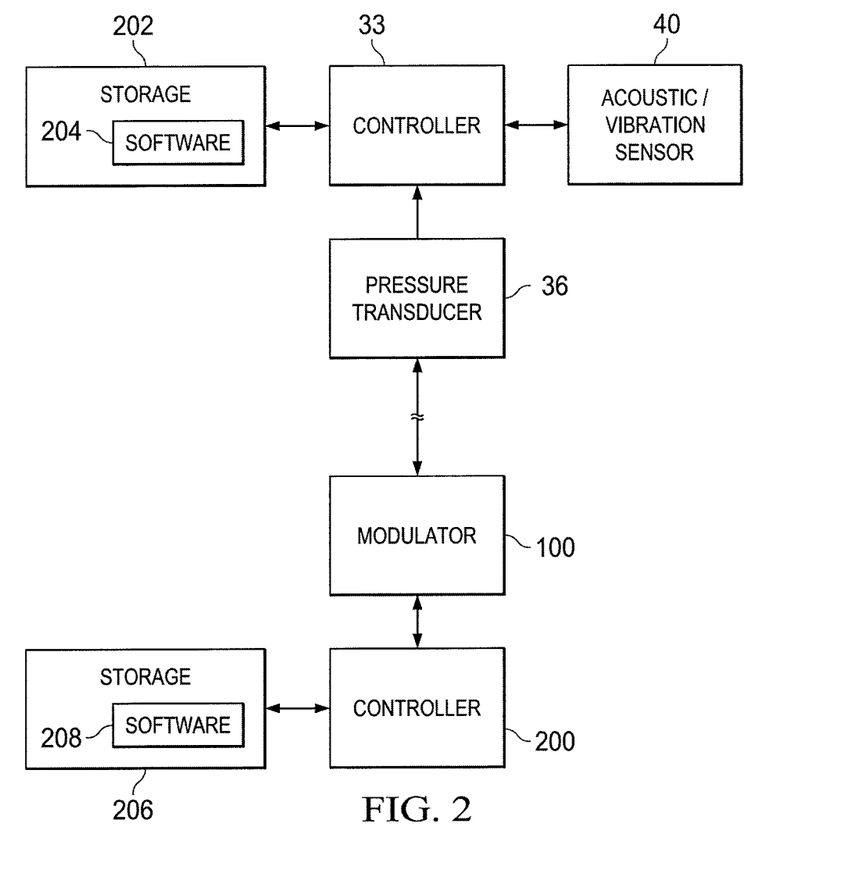
FIG. 2 is a block diagram of components usable to communicate data via a drilling mud column using DPPM.

FIG. 2 is a block diagram of components usable to communicate data via a drilling mud column using DPPM, at least some of which are also illustrated in FIG. 1. Specifically, FIG. 2 includes the controller 33, the pressure transducer 36 and the acoustic/vibration sensor 40 at the surface. The controller 33 couples to storage 202 (e.g., a hard drive) that includes software 204. The controller 33, the storage 202 and/or the software 204 may be centralized or distributed in nature. Downhole, the modulator 100 couples to a controller 200, which, in turn, couples to a storage 206 that comprises software 208. The controller 200, storage 206 and/or the software 208 may be centralized or distributed in nature. The mud column (generally indicated in FIG. 2 by numeral 210) is used to communicate between the controller 33 and the controller 200. In the specific embodiment shown in FIG. 2, communications are primarily transmitted from the downhole tool to the surface, since the modulator 100 is shown downhole and the pressure transducer 36 is shown at the surface. The scope of the disclosure, however, is not limited to such embodiments, and it fully encompasses embodiments in which communications are transmitted downhole from the surface. In such embodiments, a modulator is present at the surface to modulate the mud column, and a pressure transducer is positioned downhole to receive, demodulate and decode the pressure pulses received in the mud column. Some or all of the encoding, decoding, modulation and demodulation is performed by transducers and modulators as directed by the controller 53 and/or controller 200 that is executing software 204 and/or software 208, respectively. Illustrative, non-limiting encoding and modulation techniques that may be deployed in the embodiments of FIGS. 1 and 2 are described below with respect to FIGS. 3-6.

Figure 3:
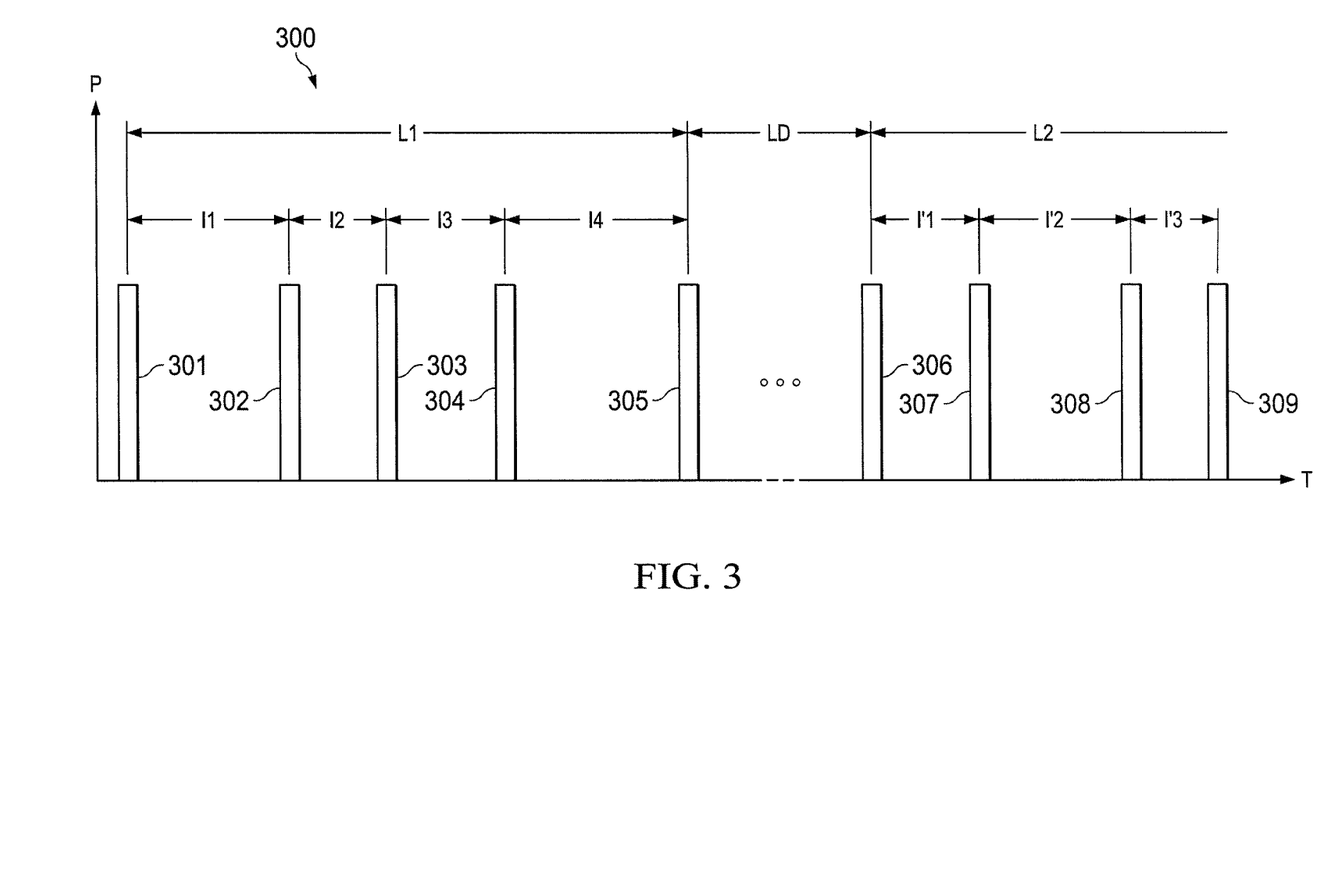
FIG. 3 is a graph illustrating a series of exemplary mud pulse signals that include multiple codewords.

FIG. 3 is a graph 300 illustrating a series of exemplary mud pulse signals that include multiple DPPM codewords. Specifically, the graph 300 shows time on the x-axis and pressure on the y-axis. A series of pulses 301-309 is shown along the x-axis. Because these pulses employ DPPM, the time between each consecutive pair of pulses encodes some data and is considered to be an independent codeword. For example, the time between pulses 301 and 302 is labeled in FIG. 3 as "I1" and represents a single codeword of data under the DPPM scheme. Similarly, the time between pulses 302 and 303 is labeled "I2;" the time between pulses 303 and 304 is labeled "I3;" and the time between pulses 304 and 305 is labeled "I4" Together, the codewords represented by codewords I1-I4 constitute the list L1. After a list delimiter period LD, the next list L2 begins. The list L2 comprises codewords I'1, I'2, I'3, and so forth, each representing a separate codeword of data. Codewords can accommodate different numbers of bits depending on the specific implementation of DPPM used. For instance, each codeword may contain three bits, so in the example of FIG. 3, codewords I1-I4 in list L1 can carry a total of 12 bits of data.

Figure 4:
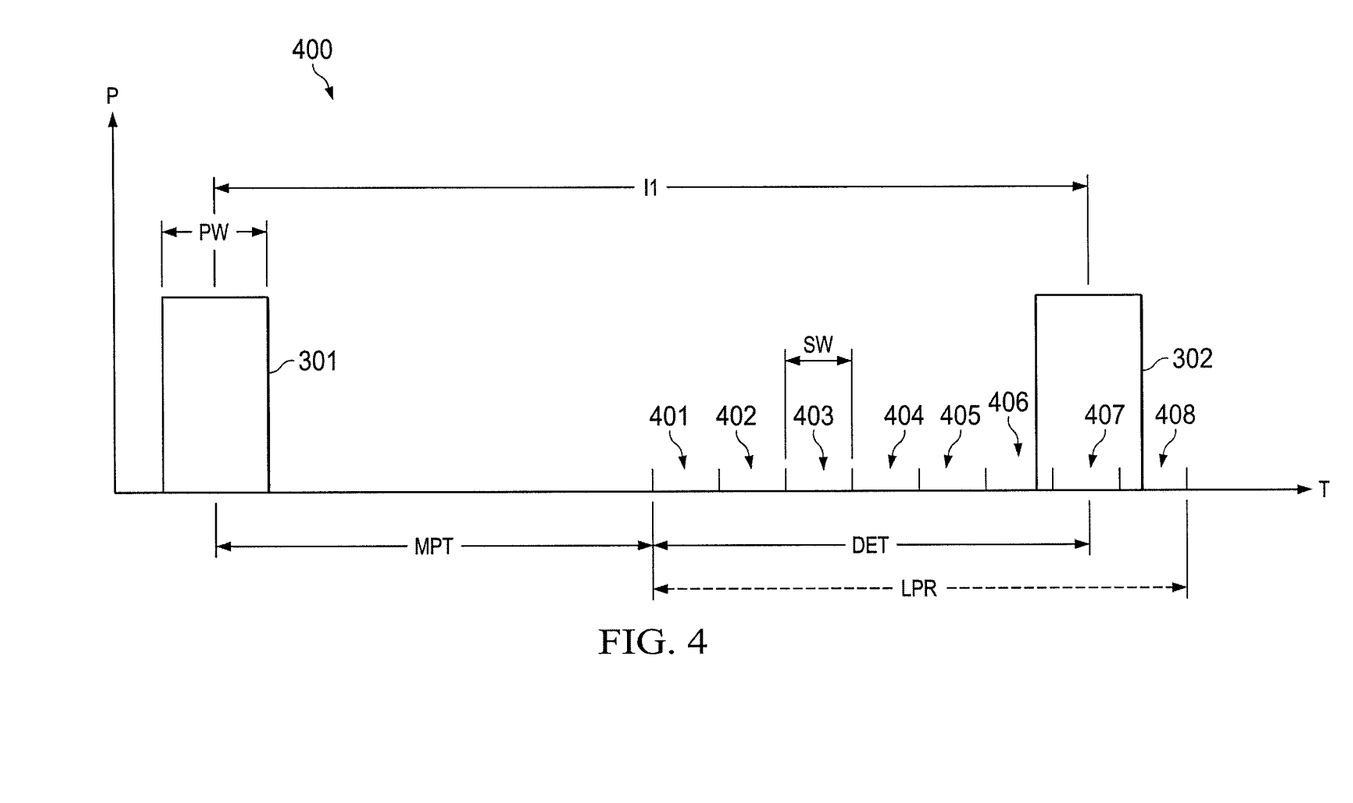
FIG. 4 is a graph illustrating exemplary mud pulse signals that represent a single codeword.

FIG. 4 is a graph 400 illustrating exemplary mud pulse signals that represent a single codeword. Specifically, the graph 400 shows details pertaining to the codeword I1 from FIG. 3. Each of the pulses 301, 302 has a pulse width—for instance, the pulse width "PW" shown with respect to pulse 301. The minimum pulse interval time (MPT) shows the minimum amount of time that must separate the pulses in a given DPPM scheme. Following the MPT is the data encoding time (DET). The DET should fall within the Legal Pulse Positioning Range ("LPR"), within which the second pulse 302 must appear. The specific time at which the second pulse 302 appears is equal to the sum of MPT and DET, and DET indicates the data contained within that codeword. To facilitate such encoding, the DET contains a plurality of bit windows (BW) 401-408, each bit window associated with a different data value. Thus, for instance, because the second pulse 302 is centered on the bit window 407, the receiver interprets the codeword as having a particular data value, whereas it would interpret the codeword to have a different value if the second pulse 302 had been centered on the bit window 401. Because there are eight BWs 401-408 in the codeword of FIG. 4, that codeword can encode up to eight different data values and is thus considered to be a three-bit codeword (i.e., $2^3=8$). The software 204 and 208 in FIG. 2 are programmed so that they are able to decode any data received from the opposite end of the mud column.

Pressure pulses are subject to various types of absorption, reflection and interference (e.g., due to drill bit slip/stuck) as they travel along the mud column. Those effects can distort the pulse signals in different ways. When the effect is strong enough, pseudo pulses can be created and injected into the communicating pulse train. For example, the slip-to-stuck or jittering drill bit can modulate the drilling mud column and mimic the effect of mud pulse telemetry. In another case, when the effect is destructively superimposed on the original communicating pulse train, some pulses may be cancelled, resulting in "Pulse Missing" errors. Pulse addition or missing are difficult to correct, but they rarely occur. In more common instances, the noisy interference has an energy spectrum different from the original pulse. Thus, they may not completely mimic or cancel the original pulses. Instead, they distort the shapes of original pulses and consequentially shift them away from the pulses' original bit windows. This type of error is called "pulse shifting." In pulse shifting, a pulse is received at the receiver in a time-shifted position compared to the original pulse. In significant instances of pulse shifting, the pulse is identified as being in a different bit window than the bit window that was intended. For instance, in FIG. 4, pulse shifting can cause a receiver to determine that pulse 302 is actually in bit window 406, even though it was transmitted in bit window 407. Due to such pulse shifting, incorrect data values are transmitted.

Figure 5A:
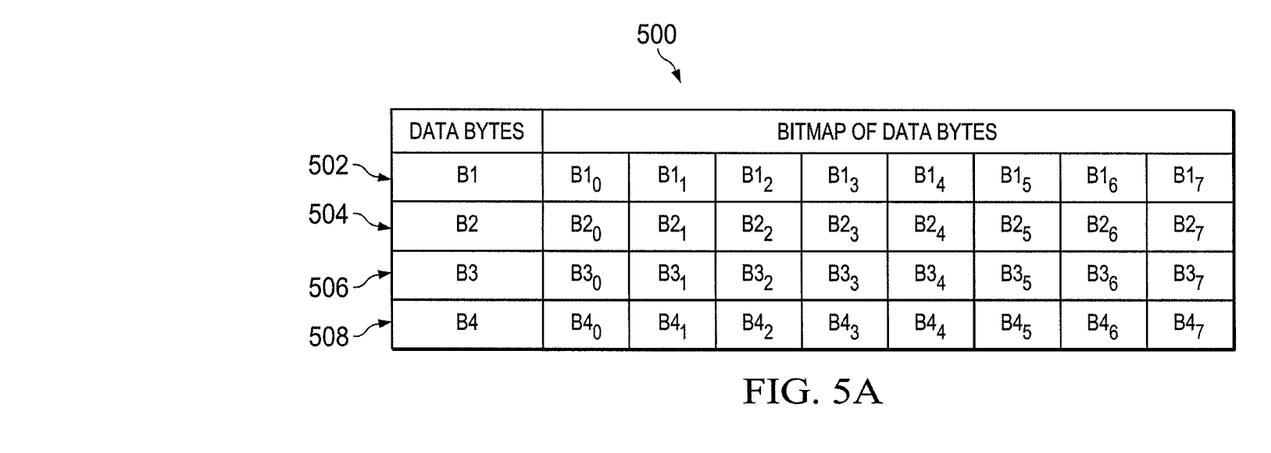
FIG. 5A is a table showing a bitmap of four bytes of data that are transmitted via a mud column using DPPM.
Figure 5B:
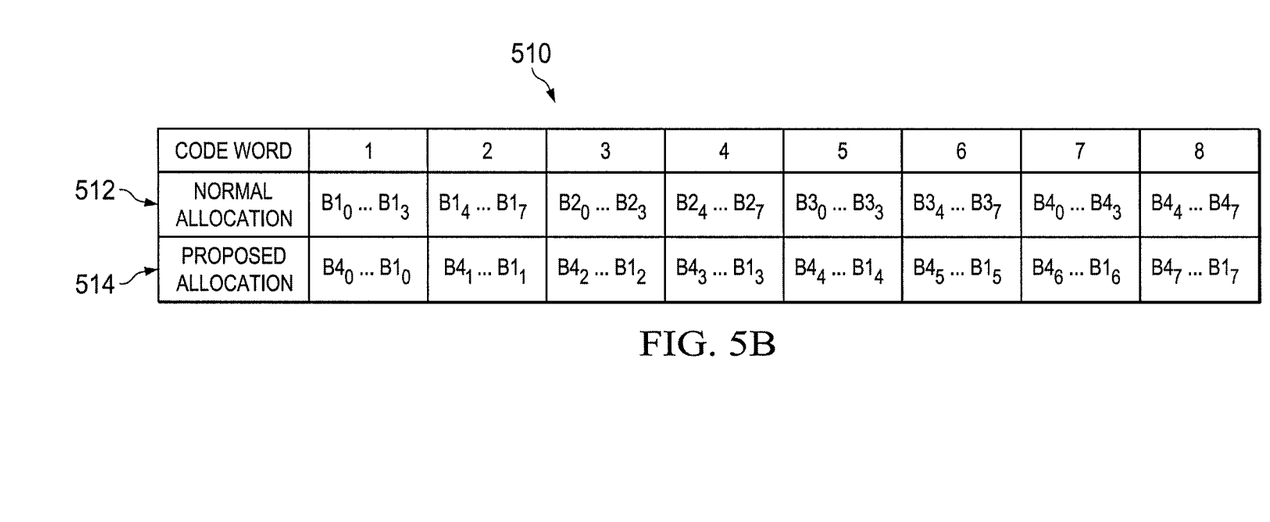
FIG. 5B is a table showing a bit allocation scheme for four bytes of data that are transmitted via a mud column using DPPM.

Notably, however, pulse shifting typically does not cause very wide swings in pulse timing. In other words, pulse shifts are typically small (but are significant and common) in nature. Thus, the pulse shifts are most likely to affect the least significant bit(s) of a codeword and are less likely to affect the more significant bit(s) of the codeword. This is because the most significant bit has a greater weight than the least significant bit. For instance, in the three-bit codeword of FIG. 4, pulse shifting will cause changes in the least significant bit, but is unlikely to cause changes in the most significant bit. The bit-scrambling techniques described herein leverage this fact by encoding the most important—or most volatile—data in the "safer," more significant bits that are protected from the effects of pulse shifting, and by encoding the less important—or less volatile—data in the less safe, less significant bits that are more susceptible to the effects of pulse shifting. FIGS. 5A and 5B, now discussed, help illustrate such strategic encoding.

FIG. 5A is a table 500 showing a bitmap of four bytes of data that are transmitted via a mud column using DPPM. The table 500 lists data bytes B1-B4 in rows 502, 504, 506 and 508, respectively. The data bytes B1-B4 are bytes that are to be encoded using the strategic bit-scrambling technique described herein. Each of these bytes has bits 0-7. Thus, for instance, as shown in row 502, data byte B1 has bits $B1_0 \ldots B1_7$. The same is true for bytes B2-B4.

FIG. 5B is a table 510 showing a bit allocation scheme for the four bytes of data B1-B4 that are transmitted via a mud column using DPPM. Assume that, in order of importance and/or volatility, B4>B3>B2>B1. As shown in row 512, under a typical bit allocation, a 4-bit codeword 1 is encoded with bits $B1_0 \ldots B1_3$ (meaning that bit $B1_0$ is allocated to the most significant bit and $B1_3$ is allocated to the least significant bit); codeword 2 is encoded with bits $B1_4 \ldots B1_7$; codeword 3 is encoded with bits $B2_0 \ldots B2_3$; codeword 4 is encoded with bits $B2_4 \ldots B2_7$, and so on. Under this typical bit allocation, no preferential treatment is given to the more important and/or more volatile bits of byte B4, nor is less preferential treatment given to the less important and/or less volatile bits of byte B1. However, such preferential treatment is given under the allocation used with the strategic encoding technique described herein. Specifically, as shown in row 514, for each codeword 1-8, the most significant bit of that codeword holds a bit from the most important and/or most volatile byte B4, while the least significant bit of that codeword holds a bit from the least important and/or least volatile byte B1. For instance, in codeword 1, the most significant bit is allocated to bit $B4_0$, which is from the most important and/or most volatile byte B4. The next most significant bit in codeword 1 is allocated to bit $B3_0$, which is from the next most important and/or most volatile byte B3. The next most significant bit in codeword 1 is allocated to bit $B2_0$, which is from the next most important and/or most volatile byte B2. And the least significant bit in codeword 1 is allocated to bit $B1_0$, which is from the least important and/or least volatile byte B1. A similar encoding technique is applied to codewords 2-8 using bytes B1-B4—namely, the most significant bits in each of these codewords is allocated a bit from byte B4, and the least significant bits in each of these codewords is allocated a bit from byte B1. In this way, because the most important and/or most volatile data is safely ensconced in the most significant bits of each codeword, that data is generally protected from the deleterious effects of pulse shifting.

Although the most important and/or most volatile data B4 is protected from the effects of pulse shifting (and the same is true for bytes B3 and B2, albeit to a lesser degree), it may be beneficial in at least some instances to periodically encode and transmit the less important and/or less volatile data with the more significant bits. This may be done for multiple reasons. For instance, even though such data may not be of great importance or may not be volatile (e.g., downhole temperatures), it is still important to maintain an accurate assessment of such data. Further, comparing the received value of a less-important parameter like byte B1 when it is transmitted via the least significant bits to when it is transmitted via the most significant bits can help characterize the mud column transmission conditions. For example, B1 may be transmitted via the least significant bits and then immediately afterward may be transmitted via the most significant bits, and these back-to-back transmissions can be compared to determine the transmission conditions of the mud column. By characterizing the mud column in this way, the manner in which the mud column affects data (e.g., via pulse shifting) can be determined. This characterization can then be used when the parameter B1 is again transmitted via the least significant bits by mathematically correcting the received data to account for the transmission conditions in the mud column. Thus, for instance, if multiple comparisons between least significant bit and most significant bit transmissions reveals a calculated average difference of one second, subsequent transmissions via the least significant bit may be corrected by one second.

This same comparison technique may be used to assess the average bit error rate (BER) of the mud column over time, which is superior to the assessment of BER at a single instant. Using the time-averaged BER, the system (e.g., controller 33) may reliably determine whether transmission conditions are favorable or not and may adjust the transmission parameters accordingly to maximize data throughput while meeting minimum BER standards for a given application.

Figure 6:
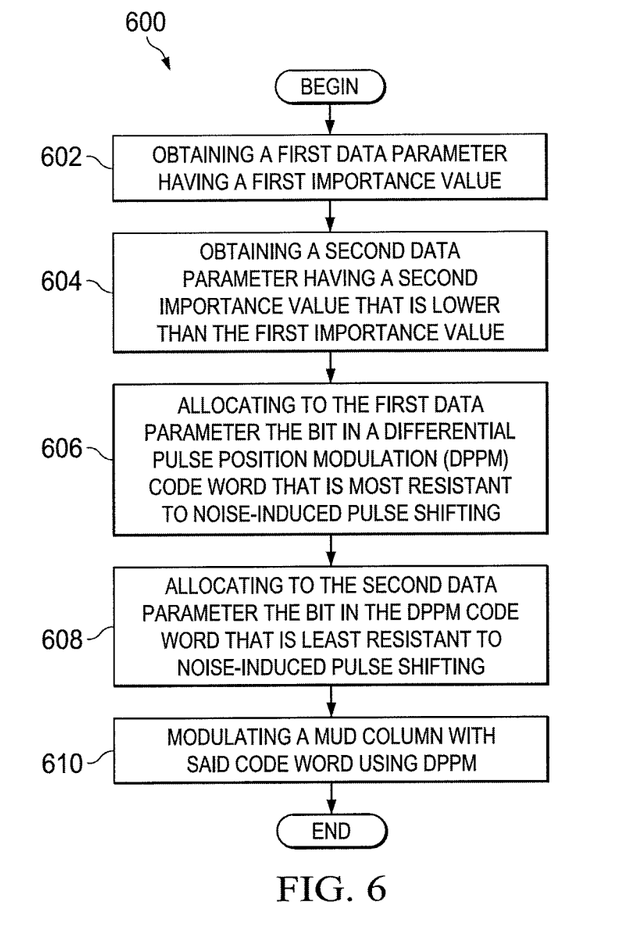
FIG. 6 is a flow diagram of a bit-scrambling method usable in conjunction with DPPM in the mud pulse telemetry context.

FIG. 6 is a flow diagram of a bit-scrambling method 600 usable in conjunction with DPPM in the mud pulse telemetry context. The method 600 begins by obtaining a first data parameter having a first importance value (step 602). Referring to illustrative FIG. 2, for instance, this step may be performed by the controller 200. The first importance value may be programmed into the software 208. The method 600 then comprises obtaining a second data parameter having a second importance value that is lower than the first importance value (step 604). As with step 602, step 604 may be performed by, e.g., the controller 200 of FIG. 2. Similarly, the second importance value and/or its relation to the first importance value may be programmed into the software 208. Next, the method 600 includes allocating to the first data parameter the bit in a DPPM codeword that is most resistant to noise-induced pulse-shifting (step 606). For example, as explained above with respect to illustrative FIG. 5B, the most significant bit in each codeword 1-8 is allocated to the bits of the most important and/or most volatile byte B4. The method 600 also comprises allocating to the second data parameter the bit in the DPPM codeword that is least resistant to noise-induced pulse-shifting (step 608). For instance, as explained above with respect to illustrative FIG. 5B, the least significant bit in each codeword 1-8 is allocated to the bits of the least important and/or least volatile byte B1. Finally, the method 600 comprises modulating a mud column with the codeword using DPPM (step 610). The bit-scrambling method 600 may be modified as desired to add, remove, or modify steps. For instance, the bit allocating described in the method 600 may be periodically reversed as described above to help characterize the mud column transmission conditions. As explained, these characterizations can subsequently be used to mathematically correct signals and to maximize data throughput.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

In at least some embodiments, a system comprises a controller; and a mud pulse telemetry modulator coupled to the controller and configured to modulate a mud column using differential pulse position modulation (DPPM) code words comprising most significant bits and least significant bits, wherein the controller allocates the most significant bit in each of said code words to a first data parameter having a first importance value and the least significant bit in each of said code words to a second data parameter having a second importance value that is lower than the first importance value. Such embodiments may be modified using any of the following concepts in any order and in any combination: wherein the controller generates another DPPM code word in which the most significant bit is allocated to said second data parameter and in which the least significant bit is allocated to said first data parameter; wherein the mud pulse telemetry modulator modulates the mud column with said another DPPM code word; further comprising another controller that receives, de-modulates and de-codes the DPPM code words and said another DPPM code word to produce data, and wherein said another controller analyzes said data to characterize said mud column; wherein the another controller uses said characterization of the mud column to correct information received in one or more subsequently received DPPM code words; wherein the controller uses the characterization to determine a time-average bit error rate (BER) for the mud column and causes data transmission parameters to be adjusted to maximize data throughput via the mud column while meeting a BER requirement; wherein the first data parameter is inclination of a tool in a drill string that houses the mud pulse telemetry modulator; wherein the second data parameter is selected from the group consisting of downhole temperature and vibration; and wherein the first data parameter is more volatile than the second data parameter.

In at least some embodiments, a computer-readable medium comprises software which, when executed by a controller, causes the controller to: obtain first and second downhole parameters during a drilling operation, said second downhole parameter being less volatile than the first downhole parameter; generate a differential pulse position modulation (DPPM) code word that allocates bits in the code word to the first and second downhole parameters, said first downhole parameter assigned to a bit in the code word that has a lower probability of transmission error than a bit in the code word to which the second downhole parameter is assigned; cause the modulation of a mud column with the DPPM code word; generate another DPPM code word that reverses said bit allocation so that the first downhole parameter is assigned to a bit in said another code word that has a higher probability of transmission error than a bit in said another code word to which the second downhole parameter is assigned; and cause the modulation of the mud column with said another DPPM code word. One or more of these embodiments may be modified using any of the following concepts in any order and in any combination: wherein the controller obtains a characterization of the mud column that is based on at least said DPPM code word and said another DPPM code word; wherein the controller adjusts a data rate at which it transmits data through the mud column based on said characterization; wherein the first downhole parameter is inclination of a tool in a drill string; wherein the second downhole parameter is selected from the group consisting of downhole temperature and vibration; and wherein the software classifies the first downhole parameter as being more important than the second downhole parameter.

In at least some embodiments, a method comprises: obtaining a first data parameter having a first importance value; obtaining a second data parameter having a second importance value, said second importance value lower than the first importance value; allocating to the first data parameter the bit in a differential pulse position modulation (DPPM) code word that is most resistant to noise-induced pulse shifting; allocating to the second data parameter the bit in the DPPM code word that is least resistant to noise-induced pulse shifting; and modulating a mud column with said code word using DPPM. These embodiments may be modified using any of the following concepts in any order and in any combination: wherein the first data parameter is more volatile than the second data parameter; wherein said bit allocated to the first data parameter is the most significant bit in the DPPM code word; wherein said bit allocated to the second data parameter is the least significant bit in the DPPM code word; and further comprising characterizing the mud column based on a re-allocation of said DPPM code word bits to the first and second data parameters, and further comprising correcting a subsequent DPPM code word received via said mud column using the characterization.

What is claimed is:

1. A system, comprising:
a controller, wherein the controller is configured to perform a bit-scrambling technique that identifies and encodes most significant bits and least significant bits from one or more data bytes in a data stream; and
a mud pulse telemetry modulator coupled to the controller and configured to modulate a mud column using differential pulse position modulation (DPPM) code words comprising most significant bits and least significant bits,
wherein the controller allocates, for a first transmission of a first DPPM code word, the most significant bit in the first DPPM code word to a first data parameter having a first importance value and the least significant bit in the first DPPM code word to a second data parameter having a second importance value that is lower than the first importance value, wherein a data encoding time (DET) for a first pulse occurs during a time period when a second pulse appears, and
wherein the controller allocates, for a second transmission of a second DPPM code word, the most significant bit in the second DPPM code word to the second data parameter having the second importance value and the least significant bit in the second DPPM code word to the first data parameter having the first importance value that is higher than the second importance value, wherein the first and second transmissions are consecutive.

2. The system of claim 1, wherein the controller generates another DPPM code word in which the most significant bit is allocated to said second data parameter and in which the least significant bit is allocated to said first data parameter.

3. The system of claim 2, wherein the mud pulse telemetry modulator modulates the mud column with said another DPPM code word.

4. The system of claim 3, further comprising another controller that receives, de-modulates and de-codes the DPPM code words and said another DPPM code word to produce data, and wherein said another controller analyzes said data to characterize said mud column.

5. The system of claim 4, wherein the another controller uses said characterization of the mud column to correct information received in one or more subsequently received DPPM code words.

6. The system of claim 4, wherein the controller uses the characterization to determine a time-average bit error rate (BER) for the mud column and causes data transmission parameters to be adjusted to maximize data throughput via the mud column while meeting a BER requirement.

7. The system of claim 1, wherein the first data parameter is inclination of a tool in a drill string that houses the mud pulse telemetry modulator.

8. The systems of claim 1, wherein the second data parameter is selected from the group consisting of downhole temperature and vibration.

9. The systems of claim 1, wherein the first data parameter is more volatile than the second data parameter.

10. A non-transitory computer-readable medium comprising software which, when executed by a controller, causes the controller to:
obtain first and second downhole parameters during a drilling operation as one or more data bytes, said second downhole parameter being less volatile than the first downhole parameter;
identifying the first downhole parameter from the one or more bytes;
identifying the second downhole parameter from the one or more bytes;
encoding the first downhole parameter having a first importance value with bit-scrambling;
encoding the second downhole parameter having a second importance value with the bit-scrambling;
generate a first differential pulse position modulation (DPPM) code word that allocates bits in the first DPPM code word to the first and second downhole parameters, said first downhole parameter assigned to a first bit in the first DPPM code word that has a lower probability of transmission error than a second bit in the first DPPM code word to which the second downhole parameter is assigned;
generate a second DPPM code word that allocates bits in the second DPPM code word to the first and second downhole parameters, said first downhole parameter assigned to a first bit in the second DPPM code word that has a higher probability of transmission error than a second bit in the second DPPM code word to which the second downhole parameter is assigned; and
consecutively transmit the first and second DPPM code words as mud pulses with a mud pulse telemetry modulator;
wherein a data encoding time (DET) for a first pulse occurs during a time period when a second pulse appears.

11. The medium of claim 10, wherein the controller obtains a characterization of the mud column that is based on the first and second DPPM code words.

12. The medium of claim 11, wherein the controller adjusts a data rate at which it transmits data through the mud column based on said characterization.

13. The medium of claim 10, wherein the first downhole parameter is inclination of a tool in a drill string.

14. The medium of claim 10, wherein the second downhole parameter is selected from the group consisting of downhole temperature and vibration.

15. The medium of claim 10, wherein the software classifies the first downhole parameter as being more important than the second downhole parameter.

16. A method, comprising:
obtaining a data stream with one or more data bytes;
identifying a first data parameter from the one or more bytes;
identifying a second data parameter from the one or more bytes;
encoding the first data parameter having a first importance value with bit-scrambling;
encoding the second data parameter having a second importance value with the bit-scrambling, said second importance value lower than the first importance value;

allocating to the first data parameter, a first bit in a first differential pulse position modulation (DPPM) code word that is most resistant to noise-induced pulse shifting;

allocating to the second data parameter, a second bit in the first DPPM code word that is least resistant to noise-induced pulse shifting;

allocating to the first data parameter, a first bit in a second DPPM code word that is least resistant to noise-induced pulse shifting;

allocating to the second data parameter, a second bit in the second DPPM code word that is most resistant to noise-induced pulse shifting; and consecutively transmitting the first and second DPPM code words as mud pulses with a mud pulse telemetry modulator, wherein a data encoding time (DET) for a first pulse occurs during a time period when a second pulse appears.

17. The method of claim 16, wherein the first data parameter is more volatile than the second data parameter.

18. The method of claim 16, wherein said first bit allocated to the first data parameter is the most significant bit in the first DPPM code word.

19. The method of claim 16, wherein said second bit allocated to the second data parameter is the least significant bit in the first DPPM code word.

20. The method of claim 16, further comprising characterizing the mud column based on a re-allocation of said DPPM code word bits to the first and second data parameters, and further comprising correcting a subsequent DPPM code word received via said mud column using the characterization.

* * * * *